(12) United States Patent
Fenton et al.

(10) Patent No.: US 12,126,209 B2
(45) Date of Patent: Oct. 22, 2024

(54) MULTIFUNCTIONAL CHARGING AND LIGHTING DEVICE

(71) Applicants: Terrance Fenton, Sidney, OH (US); Kristen Strunk, Sidney, OH (US)

(72) Inventors: Terrance Fenton, Sidney, OH (US); Kristen Strunk, Sidney, OH (US)

( * ) Notice: Subject to any disclaimer, the term of this patent is extended or adjusted under 35 U.S.C. 154(b) by 20 days.

(21) Appl. No.: 18/311,463

(22) Filed: May 3, 2023

(65) Prior Publication Data

US 2023/0396094 A1 Dec. 7, 2023

Related U.S. Application Data

(60) Provisional application No. 63/349,229, filed on Jun. 6, 2022.

(51) Int. Cl.
*H02J 7/34* (2006.01)
*F21S 9/02* (2006.01)
*F21V 21/088* (2006.01)
*H02J 7/00* (2006.01)
*F21Y 113/10* (2016.01)
*F21Y 115/10* (2016.01)

(52) U.S. Cl.
CPC ............... *H02J 7/342* (2020.01); *F21S 9/02* (2013.01); *F21V 21/088* (2013.01); *H02J 7/0042* (2013.01); *F21Y 2113/10* (2016.08); *F21Y 2115/10* (2016.08)

(58) Field of Classification Search
CPC . H02J 7/342; H02J 7/0042; F21S 9/02; F21V 21/088
See application file for complete search history.

(56) References Cited

U.S. PATENT DOCUMENTS

| | | | |
|---|---|---|---|
| 10,415,748 B2 | 9/2019 | Wang | |
| 10,795,245 B1 | 10/2020 | Kaiser | |
| 2015/0263553 A1* | 9/2015 | Fuller | H04M 1/04 320/114 |
| 2016/0209733 A1 | 7/2016 | Akai | |
| 2019/0237977 A1* | 8/2019 | Bober | H02J 7/00302 |
| 2019/0243214 A1 | 8/2019 | Penaflor | |
| 2020/0012174 A1 | 1/2020 | Shoemake | |
| 2021/0242695 A1* | 8/2021 | Zadehsoltan | H02J 50/80 |
| 2022/0352681 A1* | 11/2022 | Georgiades | H01R 13/6675 |
| 2023/0352967 A1* | 11/2023 | Torres | H02J 7/0048 |
| 2024/0167676 A1* | 5/2024 | Bourne | F21L 4/08 |

* cited by examiner

*Primary Examiner* — Christopher E Dunay
(74) *Attorney, Agent, or Firm* — Brennan, Manna & Diamond, LLC

(57) ABSTRACT

The present invention relates to a novel multifunctional charging and lighting device. The device is in the shape of a cube and includes LEDs disposed along the faces thereof for providing multicolor illumination. A removable portion of the device having a rechargeable battery is configured to provide electric power to recharge a mobile device. A color selection button is disposed on the removable portion for illuminating LEDs disposed in the removable portion in a specific color. In one embodiment, the color selection button can control illumination of other LEDs disposed in the cube. The device can be used for recharging mobile devices and/or providing tabletop lighting, and more.

20 Claims, 7 Drawing Sheets

MULTIFUNCTIONAL CHARGING AND LIGHTING DEVICE

CROSS-REFERENCE TO RELATED APPLICATION

The present application claims priority to, and the benefit of, U.S. Provisional Application No. 63/349,229, which was filed on Jun. 6, 2022, and is incorporated herein by reference in its entirety.

FIELD OF THE INVENTION

The present invention generally relates to the field of mobile phone charging devices. More specifically, the present invention relates to a novel multifunctional lighting and charging device. The device is portable and has a plurality of LEDs for providing multicolor illumination. A removable portion of the device is designed to provide electric power to recharge mobile phones through a USB cord. The LEDs can be selectively illuminated in a specific color for creating different effects. The device is used for charging mobile phones, providing backlighting, and enabling different aesthetic customizations. Accordingly, the present disclosure makes specific reference thereto. Nonetheless, it is to be appreciated that aspects of the present invention are also equally applicable to other like applications, devices, and methods of manufacture.

BACKGROUND

By way of background, the use of handheld and portable electronic devices, such as mobile devices, cell phones, music players, and the like, have become ubiquitous and individuals spend quite a lot of time on such electronic devices. Use of such handheld electronic devices requires that the devices be accessible to a rechargeable power source to recharge the electronic equipment as the battery drains very quickly and individuals may miss communication, entertainment, and more due to lack of battery power (i.e., discharged battery). As such, airports, businesses, and more have charging centers/kiosks, which allow a user of an electronic device to charge the electronic device while on the move. Now a days, private vehicles have a place to connect electronic devices to be charged while driving. However, while commuting in general and in public transport, electrical outlets are not typically accessible. Running out of cell phone battery charge without access to a wall outlet and charger can be incredibly frustrating for individuals. As a result, individuals desire an improved way of recharging their phones on the go in an easy and cost-efficient manner.

A common use of smartphones is to click photographs and capture videos. Individuals generally look for external light sources to improve lighting and to enhance smartphone videos and photos. Purchasing and managing external lights is difficult and expensive. Individuals desire a device that can easily improve the quality of their videos and photos.

A lot of individuals face a common problem of feeling unsafe in the dark, at night, or in low light conditions while walking outdoors. Many times, their smartphone also gets discharged thus preventing them from contacting friends and family while walking alone in the dark. Individuals desire a device that provides illumination while recharging their smartphones and/or further provides for selective illumination to enhance protection and security.

Therefore, there exists a long-felt need in the art for a multifunctional device that can charge a phone's battery and offer colorful ambient lighting. There is also a long-felt need in the art for a multifunctional mobile phone charging device that eliminates the requirement of an electrical wall outlet for providing electric power to a mobile phone. Additionally, there is a long-felt need in the art for a smartphone charging device that provides a night light to users. Moreover, there is a long-felt need in the art for a multifunctional device that provides multicolor lighting to improve phone videos and photos. Further, there is a long-felt need in the art for a multifunctional mobile phone charging device that obviates requirement of external lighting device for capturing enhanced phone videos and photos. Furthermore, there is a long-felt need in the art for a device that improves security and lifestyle of users. Finally, there is a long-felt need in the art for a multifunctional lighting device for the smartphone that can be carried easily by a user for charging phones, providing backlighting, and/or providing ambient lighting.

The subject matter disclosed and claimed herein, in one embodiment thereof, comprises a portable multifunctional lighting and charging device. The device is designed as a cube-like device designed to charge phones and to offer colorful ambient lighting. The device features a cubical housing having a plurality of LEDs disposed therein, a detachably attached (i.e., mounted) mobile portion configured to form the top face of the housing when attached or mounted to the housing, a rechargeable battery for providing electric power to the plurality of LEDs for providing multicolor ambient illumination, the mobile portion includes a separate battery for providing electric power to a plurality of LEDs disposed therein for providing multicolor ambient illumination and further includes a USB charging port for receiving a USB connector of a USB cord for providing electric power to recharge an electronic device such as a smartphone. The rechargeable battery of the mobile portion is recharged using a charging port disposed thereon.

In this manner, the multifunctional lighting and charging device of the present invention accomplishes all of the forgoing objectives and provide users with a device designed to charge phones, offer colorful ambient lighting, and/or provide backlighting. The device allows users to select different colors to enhance lighting effects of a room, while taking photos and videos. The device also provides illumination for providing safety to a user during the night and in dark areas while providing charging to external smartphones.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a portable multifunctional lighting and charging device. The device is designed as a cube-like device designed to charge phones and offer colorful ambient lighting. More specifically, the device further comprising a cubical housing having a plurality of LEDs disposed therein, a detachably attached (i.e., mounted) mobile portion configured to form the top face of the housing, a rechargeable battery for providing electric power to the plurality of LEDs for providing illumination, the mobile portion includes a separate battery for providing electric power to a plurality of LEDs disposed therein and further includes a USB charging port for receiving a USB connector of a USB cord for providing electric power to recharge an electronic device such as a smartphone.

In yet another embodiment, the mobile portion has a power button for activating and deactivating the LEDs disposed in the mobile portion and a color selection slider button for selecting a specific color for illumination by a plurality of LEDs disposed in the mobile portion.

The subject matter disclosed and claimed herein, in one embodiment thereof, comprises a multifunctional lighting and charging device for smartphones. The device is used for charging a smartphone using a USB cord and for providing multicolor illumination. The device has a cube-shape configuration and features a plurality of LEDs disposed therein, a removable portion is detachably attached or mounted to form the cube-shape and includes a rechargeable battery, a charging port for recharging the battery, a USB port for receiving a USB connector for providing electric power to recharge, for example, a smartphone. A LED color selecting button disposed on the removable portion is used for selecting a color for illumination of the LEDs.

In one embodiment, the LED color selecting button is configured to control the color of the LEDs disposed in the device and alternatively, is configured to control the color of the LEDs disposed only in the removable portion.

In yet another embodiment, the lighting and charging device has a rechargeable battery and the removable portion has a separate battery for providing electric power to a connected smartphone.

In yet another embodiment, a cube-like device designed to charge phones and provide backlights of different colors is disclosed. The device includes a small removable portion for charging phones and providing backlighting wherein the removable portion comes with a carrying case or carrying clip. The removable portion has a plurality of LEDs disposed therein and a rechargeable battery for providing electric power, a charging port for receiving electric power for recharging the rechargeable battery, a universal USB port for receiving a USB connector for providing electric power to a connected smartphone, a color selection slider button for selecting one or more illuminating colors for the plurality of LEDs. The removable portion when attached or mounted to the cube-like device may provide electric power to the LEDs disposed in other areas of the cube-like device.

In yet another embodiment, the carrying case has a cavity for accommodating the cube-like device and has a slot each for accessing color selection slider button, charging port, and universal USB port.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
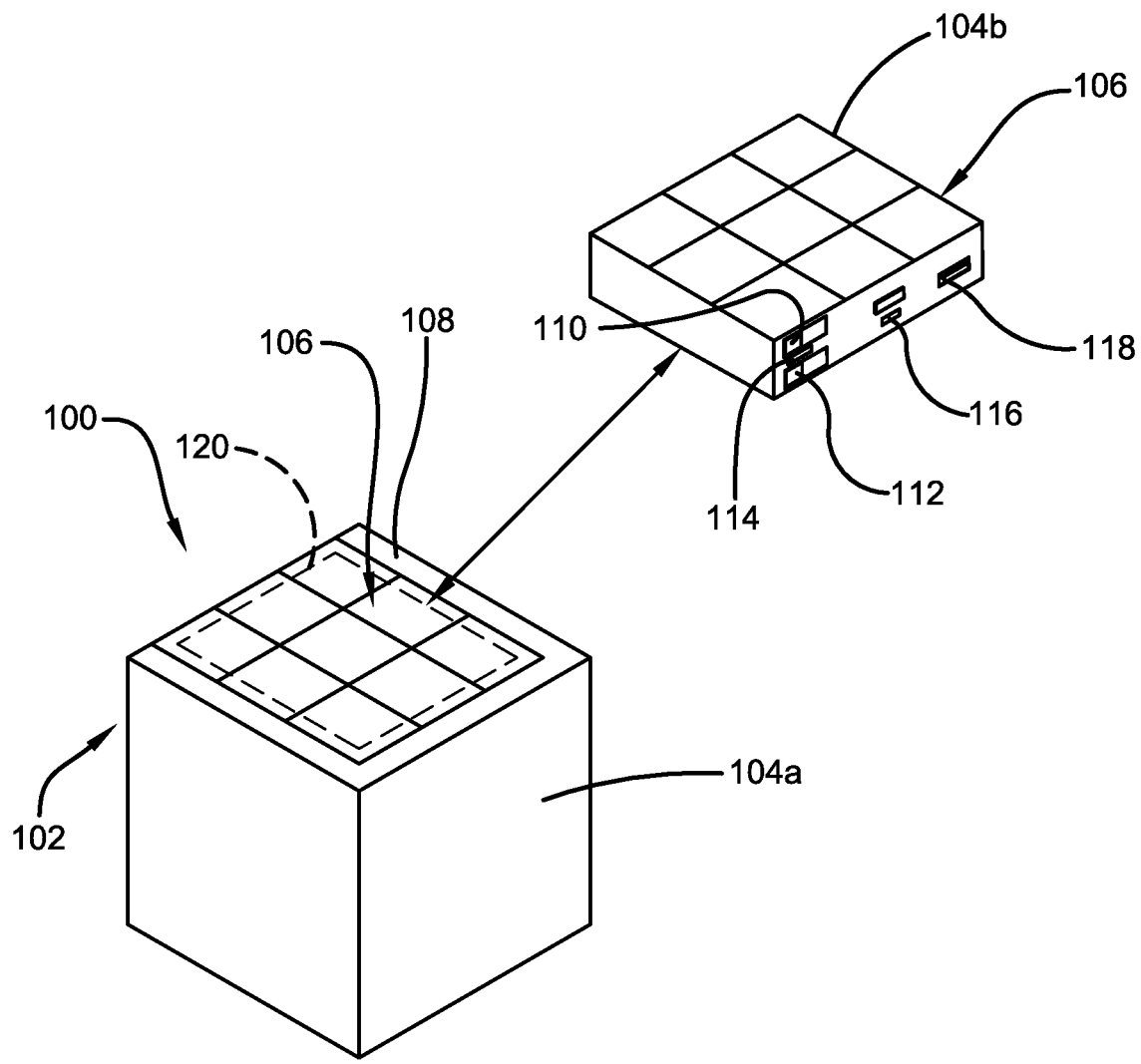
FIG. 1 illustrates a perspective view of a multifunctional smartphone charging and lighting device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a multifunctional device that can charge phones' batteries and offer colorful ambient lighting. There is also a long-felt need in the art for a multifunctional mobile phone charging device that eliminates the requirement of an electric wall outlet for providing electric power to a mobile phone. Additionally, there is a long-felt need in the art for a smartphone charging device that provides a night light to users. Moreover, there is a long-felt need in the art for a multifunctional device that provides multicolor lighting to improve phone videos and photos. Further, there is a long-felt need in the art for a multifunctional mobile phone charging device that obviates requirement of external lighting device for capturing enhanced phone videos and photos. Furthermore, there is a long-felt need in the art for a device that improves security and lifestyle of users. Finally, there is a long-felt need in the art for a multifunctional lighting device for the mobile phone that can be carried easily by a user for charging phones, providing backlighting, and/or enabling ambient lighting.

The present invention, in one exemplary embodiment, is a cube-like device designed to charge phones and provide backlights of different colors. The device includes a small removable portion for charging phones and providing backlighting wherein the removable portion comes with a carrying case. The removable portion has a plurality of LEDs disposed therein and a rechargeable battery for providing electric power, a charging port for receiving electric power for recharging the rechargeable battery, a universal USB port for receiving a USB connector for providing electric power to a connected smartphone, a color selection slider button for selecting one or more illuminating colors for the plurality of LEDs.

Referring initially to the drawings, FIG. 1 illustrates a perspective view of the multifunctional smartphone charging and lighting device of the present invention in accordance with the disclosed architecture. The multifunctional smartphone charging and lighting device 100 of the present invention is a portable device designed to charge mobile phones and offering colorful ambient lighting. The device 100 has a cube-like housing 102 with a plurality of LEDs 104a, 104b disposed inside the housing 102 for providing multicolored illumination. LEDs 104a, 104b are designed to create various illumination effects including, but not limited to, black lights, red lights, blue lights, green lights, strobe lights, and more.

Figure 5:
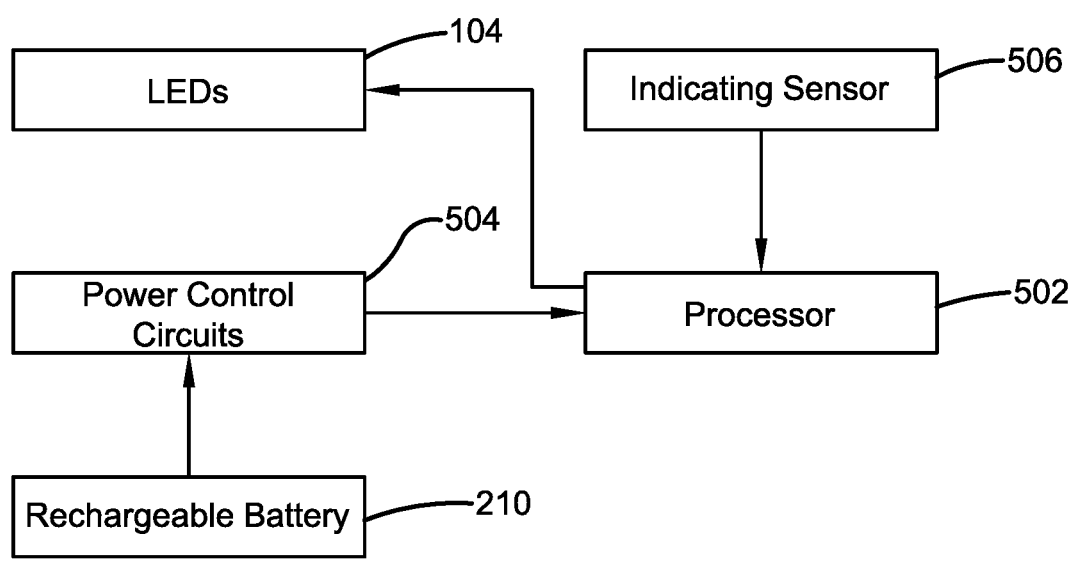
FIG. 5 illustrates a schematic view of electronic components of the cube-like device of the present invention in accordance with the disclosed architecture.

The housing 102 has a removable portion or mobile portion 106 that is detachably attached or mounted to the housing 102 and is electrically coupled to central controller as discussed in FIG. 5. The removable portion 106 preferably forms a portion of an outer surface, for example, the top face 108 of the housing 102, has the LEDs 104b and includes a rechargeable battery 120 disposed therein. The removable portion 106 includes a power button 110 for activating/deactivating the LEDs 104b of the device 100 and may be embodied as one of a push button, toggle button and more.

Figure 3:
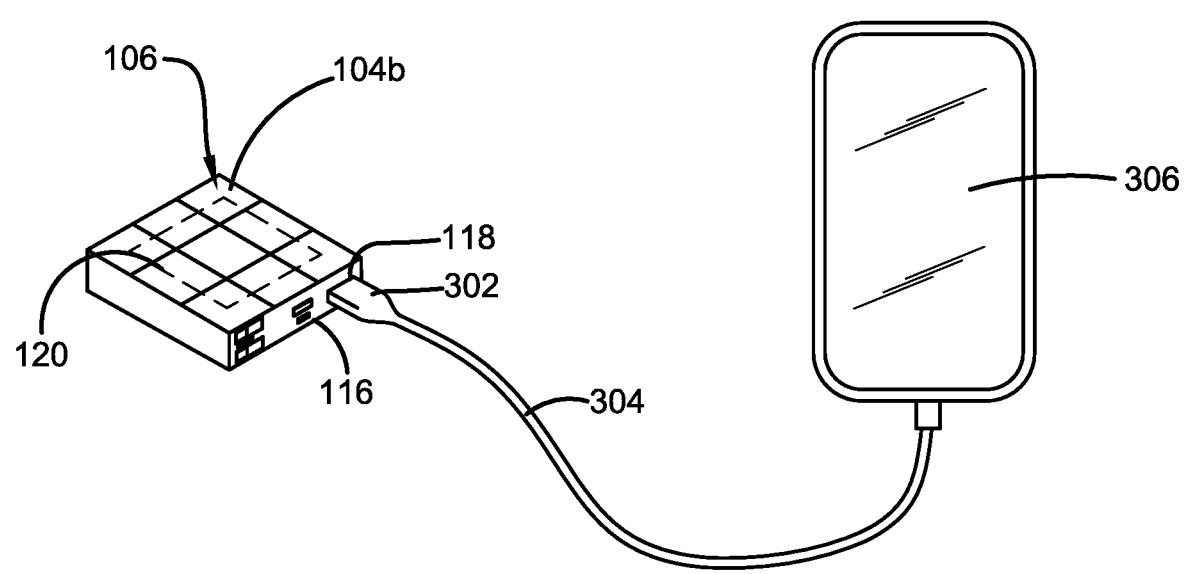
FIG. 3 illustrates a perspective view showing connection of the removable portion of the device of the present invention with a smartphone for providing electric charge in accordance with the disclosed architecture.

A sliding color selection button 112 is designed to slide along a band of colors 114 allowing a user to select a combination of colors of illumination by LED lights 104a, 104b. The button 112 is coupled to the central controller that provides a signal to the LEDs for illumination in a specific color. For recharging the built-in battery 120 of the removable portion 106, a charging port (i.e., USB-C) 116 is disposed on the mobile portion 106 that is configured to receive a USB port of an electric cord to receive electric charge or power for recharging the built-in battery of the removable portion 106. The removable portion 106 when detached from the housing 102 is used for recharging a mobile device such as a smartphone as illustrated in FIG. 3. For recharging a mobile device, a USB port (i.e., USB-A) 118 is disposed on the mobile portion 106 that enables a user to plug-in or connect the mobile device and recharge the mobile device using the rechargeable battery of the removable portion. The LEDs 104a, 104b illuminate in a way that different colors provide a lighting effect that may enhance lighting effect and ambience of a room while taking photos and videos using a smartphone.

Figure 2:
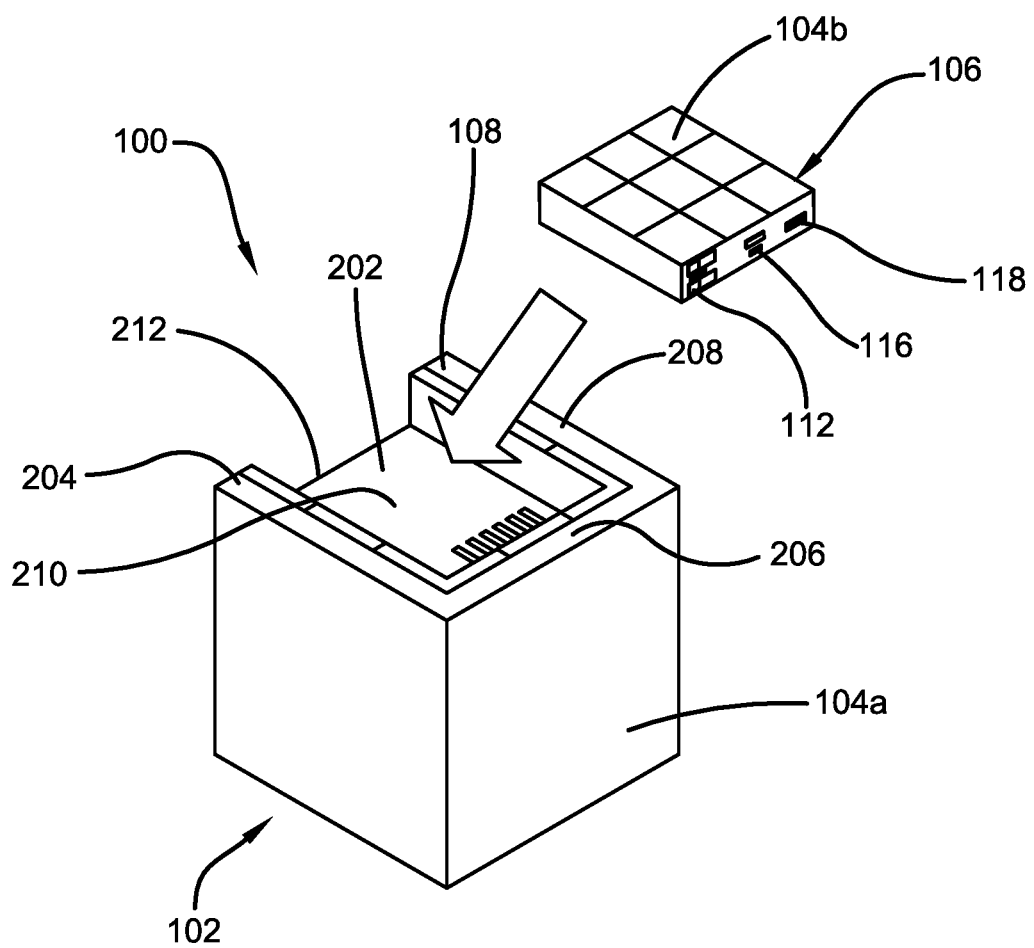
FIG. 2 illustrates a perspective view showing the removable portion being removed from the multifunctional smartphone charging and lighting device of the present invention in accordance with the disclosed architecture.

FIG. 2 illustrates a perspective view showing the removable portion being removed from the multifunctional smartphone charging and lighting device of the present invention in accordance with the disclosed architecture. The removable portion 106 is positioned on an outer side face or, for example, the top face of the device 100 such that the portion 106 is accommodated or mounted inside a cavity 202 created by the edges 204, 206, 208 of the top face 108 of the device 100. The removable portion 106 is positioned on an integrated battery 210 of the device 100 and a user can slide the portion 106 through the open end 212.

For recharging the integrated battery 210 of the device 100, a charging port (not shown) is provided that can be used for plugging in any conventional USB electric cord for providing electric power.

FIG. 3 illustrates a perspective view showing connection of the removable portion of the device 100 of the present invention with a smartphone for providing electric charge in accordance with the disclosed architecture. The removable portion 106 is designed to be removed from, for example, an outer side or top side of the device 100 for acting as an independent recharging device and includes the charging port 118 to connect the USB connector 302 of a USB charging cord 304 for providing electric power to a mobile device 306 for recharging the battery of the mobile device 306. The rechargeable battery 120 is at least a 10000 mAh Li-Ion battery and is sufficient to recharge a conventional smartphone a couple of times.

The removable portion 106 eliminates the problem of purchasing and carrying a special charging device for recharging electronic devices such as smartphones, music players, tabletop lightings, and more. The plurality of LEDs disposed inside the removable portion 106 is also configured to provide illumination for providing backlighting during low light, and ambient or directed lighting at night.

Figure 4:
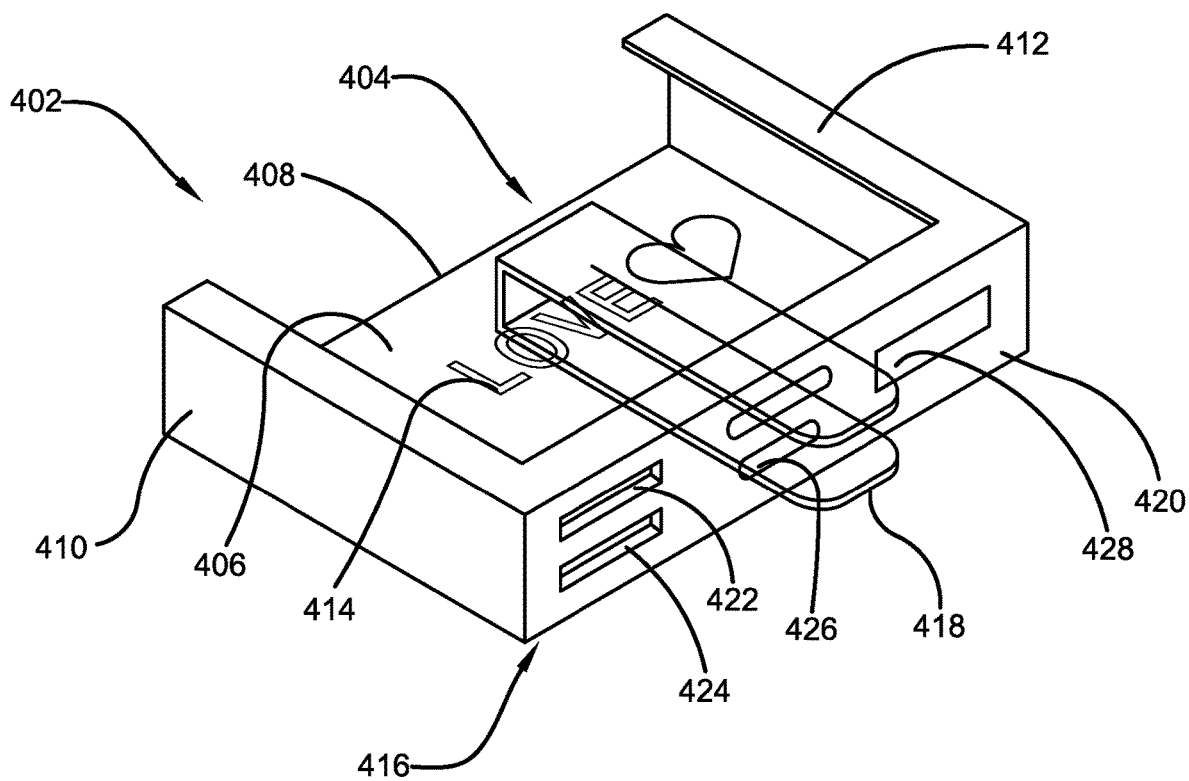
FIG. 4 illustrates a carrying mechanism for the removable portion of the lighting cube device of the present invention in accordance with the disclosed architecture.

FIG. 4 illustrates a carrying case and carrying clip for the removable portion of the lighting cube device of the present invention in accordance with the disclosed architecture. A carrying case 402 is designed to accommodate and carry the removable portion 106 allowing a user to easily carry the removable portion 106 while travelling for charging phones and providing a backlight or a flashlight. The case 402 has a cavity 404 for accommodating the portion 106 and has a front wall 406, a rear wall 408, and a pair of side walls 410, 412. The front wall 406 can include a logo or any other indicia 414 and the outer surface 416 of the rear wall 408 can include a clipped hook or carrying clip 418 for clipping the case 402 to a pocket, backpack, belt, and the like.

Bottom wall 420 of the case 402 has a slot 422, 424, 426, 428 for accessing the power button 110, light selection slider 112, charging port 116, and universal USB port 118, respectively. Advantageously, the case 402 is not required to be removed for charging an electronic device and for recharging the internal battery of the removable portion 106.

FIG. 5 illustrates a schematic view of electronic components of the cube-like device of the present invention in accordance with the disclosed architecture. As illustrated, the device 100 has a processor 502 that is configured to control operations of the device 100 and interfaces with other components of the device 100. A power control circuit 504 is configured to receive power from rechargeable battery 210 of the device 100 and control the electric charge to provide power to the LEDs. The processor 502 is also configured to change a color of illuminating LEDs of the device based on operation of the slider button of the device 100.

It should be noted that the rechargeable battery 210 is separate from the battery 120 of the removable portion 106. Further, the rechargeable battery 210 of the device 100 can also be recharged using an electric cord. An indicating sensor 506 detects the power level of battery 210 and flashes the LEDs for indicating a low battery power level.

In one embodiment, the LEDs 104a are powered by the rechargeable battery 210 and the LEDs 104b are powered by the battery 120. However, in some embodiments of the present invention, the LEDs 104b disposed in the removable portion 106 can be powered by the rechargeable battery 210 when the removable portion 106 is accommodated or mounted in the device 100.

Figure 6:
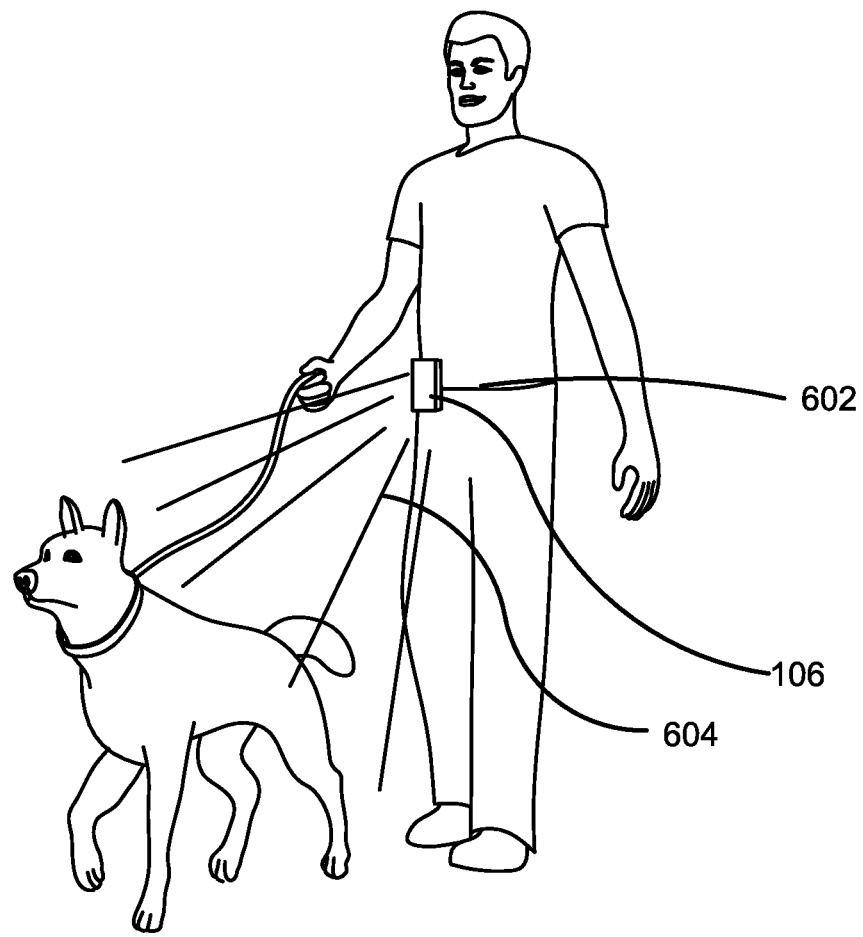
FIG. 6 illustrates a perspective view showing the mobile portion held in place on a belt, offering ample lighting to walk a dog in accordance with the disclosed architecture.

FIG. 6 illustrates a perspective view showing the mobile portion held in place on a belt, providing ample lighting to walk a dog in accordance with the disclosed architecture. In the present embodiment, the mobile portion 106, after removal from the device 100, is positioned and hooked to belt 602 using the clipped hook or carrying clip 418 (illustrated in FIG. 4). The mobile portion 106 can be used for providing illumination 604 using built in LEDs 104b that are useful at night and in low light areas. Additionally, based on requirements of the user, the mobile portion 106 can also be used for recharging an electronic device as described in FIG. 3.

Figure 7:
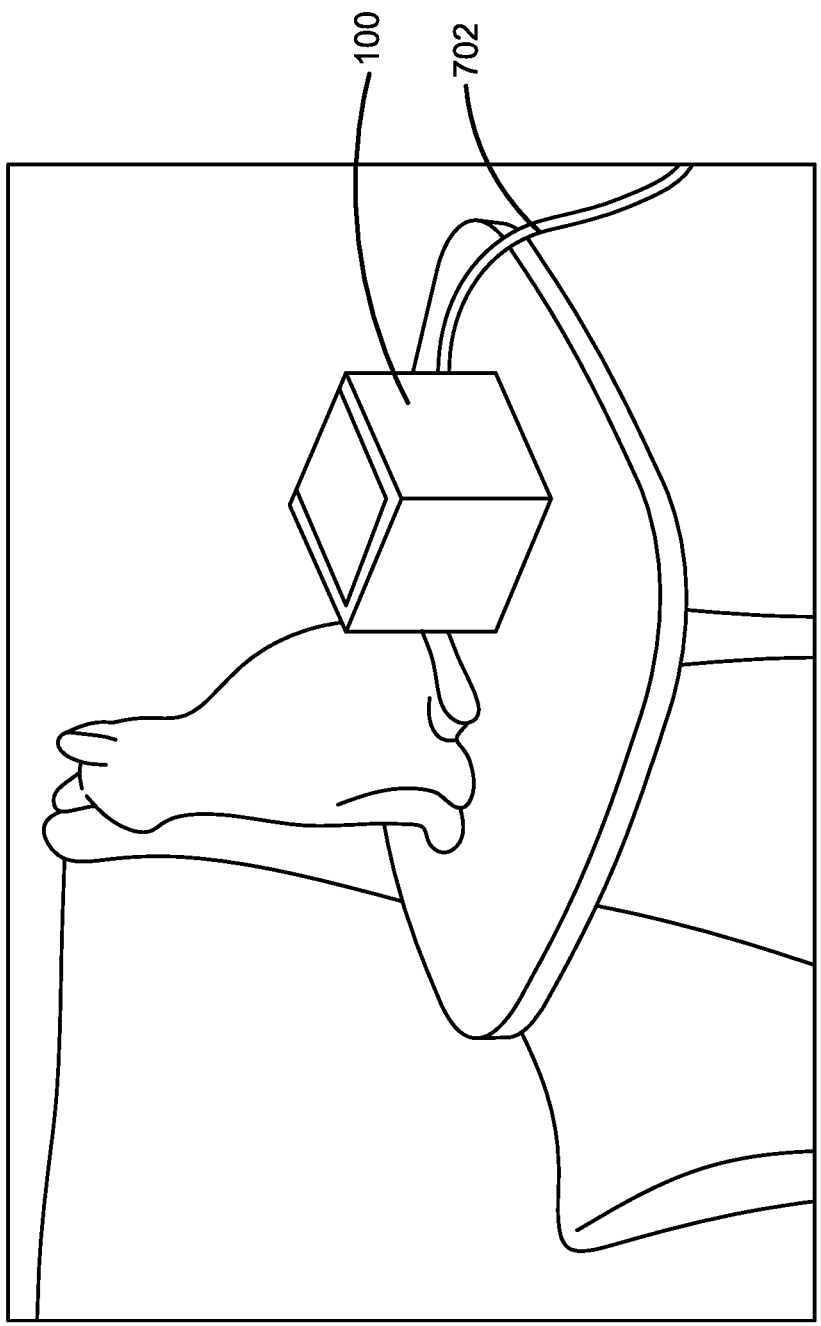
FIG. 7 illustrates a perspective view of the flash cube device of the present invention being used for aesthetic or ambient lighting on a tabletop in accordance with the disclosed architecture.

FIG. 7 illustrates a perspective view of the flash cube device of the present invention being used as an aesthetic or ambient lighting device on a tabletop in accordance with the disclosed architecture. The device 100 is configured to provide a multicolor illumination and can be used to enhance décor and illumination of a room. As illustrated, the device 100 is kept on a tabletop 702 and provides an aesthetic illumination as per the colors selected by a user as described earlier in the disclosure.

The removable portion or mobile portion 106 of the device 100 may be enclosed in tinted plastic and may have lenses to create a desired lighting effect and the carrying case 402 slides over a portion of the removable portion 106 when the portion 106 is used for recharging a mobile phone.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "flash cube", "cube-like device", "multifunctional smartphone charging and lighting device", and "device" are interchangeable and refer to the multifunctional smartphone charging and lighting device 100 of the present invention.

Notwithstanding the forgoing, the multifunctional smartphone charging and lighting device 100 of the present invention can be of any suitable size and configuration as is known in the art without affecting the overall concept of the invention, provided that it accomplishes the above-stated objectives. One of ordinary skill in the art will appreciate that the multifunctional smartphone charging and lighting device 100 as shown in the FIGS. are for illustrative purposes only, and that many other sizes and shapes of the multifunctional smartphone charging and lighting device 100 are well within the scope of the present disclosure. Although the dimensions of the multifunctional smartphone charging and lighting device 100 are important design parameters for user convenience, the multifunctional smartphone charging and lighting device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A multifunctional charging and lighting device comprising:
    a portable multifunctional charging and lighting device having a housing, a first rechargeable battery, and a first plurality of LEDs disposed around said housing;
    a mobile portion selectively detachable from said housing and having a second rechargeable battery and a second plurality of LEDs disposed around said mobile portion;
    wherein said mobile portion forming a portion of an outer surface of said housing;
    wherein said mobile portion having a power button for activating and deactivating said second plurality of LEDs; and
    further wherein said mobile portion having a USB-A port for providing electric charge to a mobile device.

2. The multifunctional charging and lighting device of claim 1, wherein said mobile device is a smartphone.

3. The multifunctional charging and lighting device of claim 2, wherein said second rechargeable battery is at least a 10000 mAh Li-Ion battery for recharging said smartphone at least a couple of times.

4. The multifunctional charging and lighting device of claim 1, wherein said mobile portion electrically coupled to said housing when said mobile portion is mounted to said housing.

5. The multifunctional charging and lighting device of claim 4, wherein said first plurality of LEDs having a multitude of colors.

6. The multifunctional charging and lighting device of claim 5, wherein said second plurality of LEDs having a multitude of colors for directing light.

7. The multifunctional charging and lighting device of claim 6, wherein said mobile portion having a sliding color selector button for selecting a particular color from said second plurality of LEDs.

8. The multifunctional charging and lighting device of claim 1, wherein said mobile portion having a charging USB-C port to receive an electric cord to receive electric charge for recharging said second rechargeable battery.

9. The multifunctional charging and lighting device of claim 8, further comprising a carrying case and carrying clip for removably housing and mounting said mobile portion.

10. The multifunctional charging and lighting device of claim 9, wherein said second plurality of LEDs are a flashlight.

11. The multifunctional charging and lighting device of claim 9, wherein said carrying case having a bottom wall including a plurality of slots for accessing at least said charging USB-C port and said USB-A port.

12. The multifunctional charging and lighting device of claim 1, wherein said forming a portion of said outer surface is a top surface.

13. The multifunctional charging and lighting device of claim 1, wherein said first rechargeable battery is separate from said second rechargeable battery.

14. The multifunctional charging and lighting device of claim 13, wherein said second plurality of LEDs are powered by said first rechargeable battery when said mobile portion is mounted to said housing.

15. The multifunctional charging and lighting device of claim 14, wherein said first plurality of LEDs and said second plurality of LEDs provide ambient lighting when said mobile portion is mounted to said housing.

16. A multifunctional charging and lighting device comprising:
   a portable multifunctional charging and lighting device having a housing, a first rechargeable battery, and a first plurality of LEDs disposed around said housing;
   a mobile portion selectively detachable from said housing and having a second rechargeable battery and a second plurality of LEDs disposed around said mobile portion;
   wherein said mobile portion forming a portion of an outer surface of said housing;
   wherein said mobile portion having a power button for activating and deactivating said second plurality of LEDs;
   wherein said mobile portion having a USB-A port for providing electric charge to a mobile device;
   wherein said mobile portion having a charging USB-C port to receive an electric cord to receive electric charge for recharging said second rechargeable battery;
   a carrying case and carrying clip for removably housing and mounting said mobile portion; and
   further wherein said second plurality of LEDs are a flashlight.

17. The multifunctional charging and lighting device of claim 16, wherein said mobile device is a smartphone.

18. The multifunctional charging and lighting device of claim 16, wherein said mobile portion electrically coupled to said housing when said mobile portion is mounted to said housing.

19. A multifunctional charging and lighting device comprising:
   a portable multifunctional charging and lighting device having a housing, a first rechargeable battery, and a first plurality of LEDs disposed around said housing;
   a mobile portion selectively detachable from said housing and having a second rechargeable battery and a second plurality of LEDs disposed around said mobile portion;
   wherein said mobile portion forming a portion of an outer surface of said housing;
   wherein said mobile portion having a power button for activating and deactivating said second plurality of LEDs;
   wherein said mobile portion having a USB-A port for providing electric charge to a mobile device;
   wherein said mobile portion having a charging USB-C port to receive an electric cord to receive electric charge for recharging said second rechargeable battery;
   wherein said second plurality of LEDs are a flashlight;
   wherein said second plurality of LEDs are powered by said first rechargeable battery when said mobile portion is mounted to said housing; and
   further wherein said first plurality of LEDs and said second plurality of LEDs provide ambient lighting when said mobile portion is mounted to said housing.

20. The multifunctional charging and lighting device of claim 19, wherein said second rechargeable battery is at least a 10000 mAh Li-Ion battery for recharging a smartphone at least a couple of times.

* * * * *